United States Patent [19]

Strobel

[11] Patent Number: 4,762,988
[45] Date of Patent: Aug. 9, 1988

[54] CIRCUIT ARRANGEMENT FOR STABILIZING AN OPTICAL RESONATOR

[75] Inventor: Otto A. Strobel, Ostfildern, Fed. Rep. of Germany

[73] Assignee: Standard Elektrik Lorenz AG, Stuttgart, Fed. Rep. of Germany

[21] Appl. No.: 53,893

[22] Filed: May 26, 1987

[30] Foreign Application Priority Data

May 24, 1986 [DE] Fed. Rep. of Germany ....... 3617562

[51] Int. Cl.$^4$ .............................. G01J 1/32; G01B 9/02
[52] U.S. Cl. ................................... 250/205; 356/352; 372/12; 350/385
[58] Field of Search ............... 350/385, 387; 356/352; 372/12, 13, 23, 24, 88; 250/205, 225, 550

[56] References Cited

U.S. PATENT DOCUMENTS

| | | | |
|---|---|---|---|
| 3,609,381 | 9/1971 | Hartfield | 350/385 |
| 3,612,655 | 10/1971 | Buchan et al. | 356/352 |
| 3,628,173 | 12/1971 | Danielmeyer | 372/34 |
| 4,094,581 | 6/1978 | Baldwin et al. | 350/387 |
| 4,233,569 | 11/1980 | Liu | 372/12 |
| 4,508,964 | 4/1985 | Gunning, III et al. | 356/352 |
| 4,558,952 | 12/1985 | Kulesh et al. | 356/352 |
| 4,632,552 | 12/1986 | Olsson et al. | 250/205 |
| 4,672,618 | 6/1987 | Wijntjes et al. | 372/34 |

FOREIGN PATENT DOCUMENTS 3421851 12/1985 Fed. Rep. of Germany .

Primary Examiner—David C. Nelms
Assistant Examiner—Michael Messinger
Attorney, Agent, or Firm—Spencer & Frank

[57] ABSTRACT

A circuit arrangement including a controllable optical resonator having a filter characteristic with a transmission peak arranged to pass laser radiation at a wavelength in the region of the transmission peak, wherein the resonator is positioned to receive the laser radiation at an angle such that two modes of the radiation, having respectively different polarization states, and wavelengths, are capable of propagating in the resonator. The resonator has control electrodes connected for receiving a voltage which determines the wavelength of the transmission peak of the filter characteristic and a source connected for applying to the electrodes a square-wave modulating voltage which varies between a first value which causes the transmission peak of the resonator to be substantially at the wavelength of one of the modes and a second value which causes the transmission peak of the resonator to be substantially at the wavelength of the other one of the modes. A device is optically coupled to the resonator for deriving two electrical signals each corresponding to radiation passing through the resonator in a respective one of the two modes. A device is connected for determining the phase difference between the two electrical signals and a device is connected for acting on the resonator in a manner to reduce the phase difference to zero on the basis of at least one of the electrical signals.

14 Claims, 2 Drawing Sheets

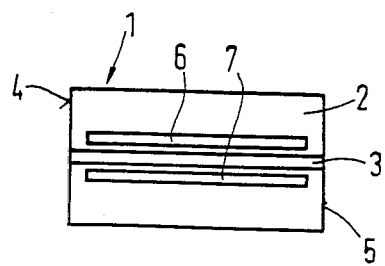
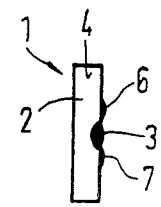
Fig.1  Fig.2
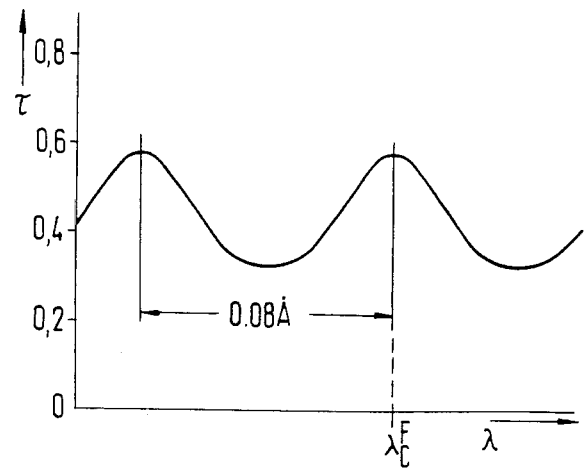
Fig.3
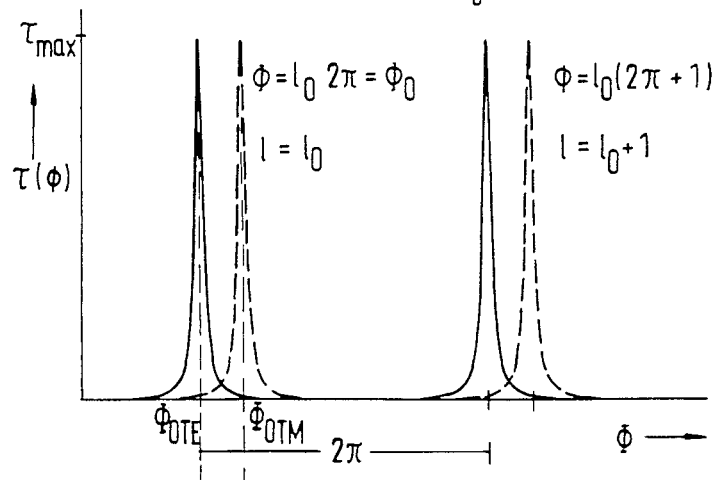
Fig.4
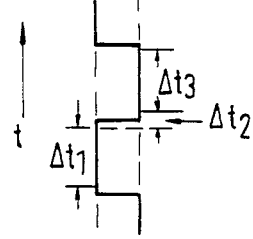

CIRCUIT ARRANGEMENT FOR STABILIZING AN OPTICAL RESONATOR

BACKGROUND OF THE INVENTION

The present invention relates to a circuit arrangement for stabilizing the peak wavelength of the filter curve of a controllable optical resonator.

Such a resonator is known per se and is used in the method disclosed in DE-OS No. 34 21 851. In such resonators, the refractive index and, thus, the peak wavelength of the filter curve are dependent on the temperature of the resonator. If the prior art resonator is used for stabilizing the wavelength of a laser, this temperature-dependent drift of the peak wavelength of the resonator's filter curve results in a corresponding drift of the peak wavelength of the laser.

SUMMARY OF THE INVENTION

Accordingly, an object of the present invention is to substantially eliminate the temperature drift of the peak wavelength of the filter curve of a resonator.

The above and other objects are achieved, according to the invention, by a circuit arrangement comprising: a controllable optical resonator having a filter characteristic with a transmission peak arranged to pass laser radiation at a wavelength in the region of the transmission peak, wherein the resonator is positioned to receive the laser radiation at an angle such that two modes of the radiation, having respectively different polarization states, and wavelengths, are capable of propagating in the resonator, the resonator having control electrodes connected for receiving a voltage which determines the wavelength of the transmission peak of the filter characteristic; means connected for applying to the electrodes a square-wave modulating voltage which varies between a first value which causes the transmission peak of the resonator to be substantially at the wavelength of one of the modes and a second value which causes the transmission peak of the resonator to be substantially at the wavelength of the other one of the modes; means optically coupled to the resonator for deriving two electrical signals each corresponding to radiation passing through the resonator in a respective one of the two modes; means connected for determining the phase difference between the two electrical signals; and means connected for acting on the resonator in a manner to reduce the phase difference to zero on the basis of at least one of the electrical signals.

With this arrangement, the drift can be kept at about $10^{-9}$ times the desired wavelength, i.e., a highly stable peak wavelength of the filter curve can be obtained.

Further advantageous details of the invention will become apparent by reference to the following description of embodiments of the invention taken in conjunction with the accompanying drawings.

BRIEF DESCRIPTION OF THE DRAWING

FIG. 1 is a top view of a resonator.

FIG. 2 is a side view of the resonator of FIG. 1.

FIG. 3 is a diagram illustrating the filter curve of the resonator of FIG. 1.

FIG. 4 is a diagram illustrating the Fabry-Perot modes of the two polarization states and illustrates the phase-switching method.

DESCRIPTION OF THE PREFERRED EMBODIMENTS

Figure 5:
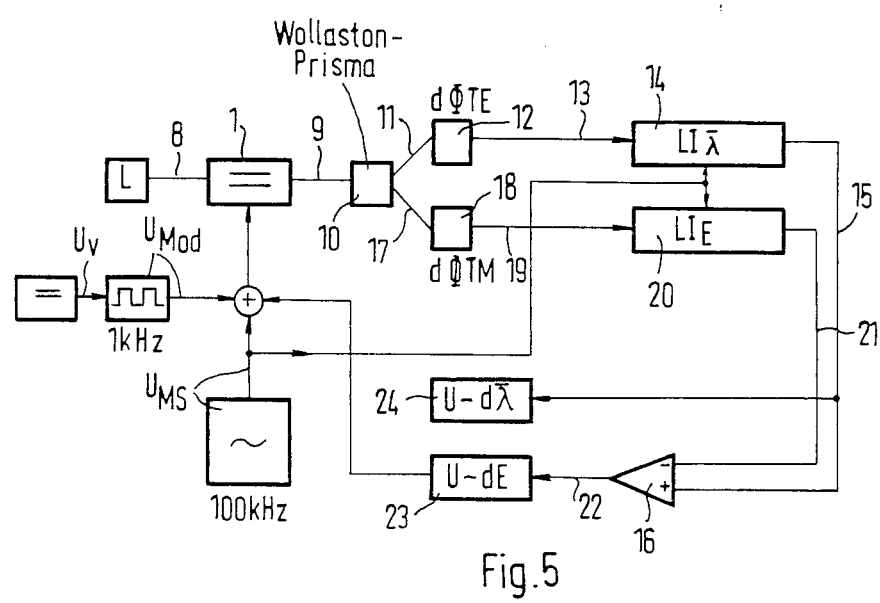
FIG. 5 is a schematic diagram of an embodiment of a circuit according to the invention in which the two modes of polarization are separated by optical means.

FIG. 1 shows an optical resonator 1 used as a Fabry-Perot interferometer. On a thin rectangular substrate 2, e.g., a lithium-niobate substrate, a stripe 3 acting as the optical resonator proper is formed by diffusion of titanium. The two end faces 4, 5 of substrate 2 are ground and polished so as to be planar and parallel to one another. Stripe 3 is bordered by electrodes 6 and 7. By applying a voltage between these electrodes 6, 7, the refractive index n of the resonator 1 can be changed, thereby shifting the filter curve, i.e. the peak wavelength of the filter curve, toward higher or lower wavelengths. A typical filter curve is shown in FIG. 3, where the peak wavelength is designated $\lambda^F{}_C$.

The transmission curve shown in FIG. 3 is due to the Fabry-Perot effect caused by fresnel reflections at the endfaces of the resonator. The free spectral range of a typical resonator (length 2 cm refraction index $\cong 2.2$) in terms of wavelengths is 0.08Å.

If the optical resonator is used as a Fabry-Perot interferometer, linearly polarized, coherent light from a laser L (see FIGS. 5 and 6) is directed to one end face 4 or 5 of the resonator 1.

Figure 6:
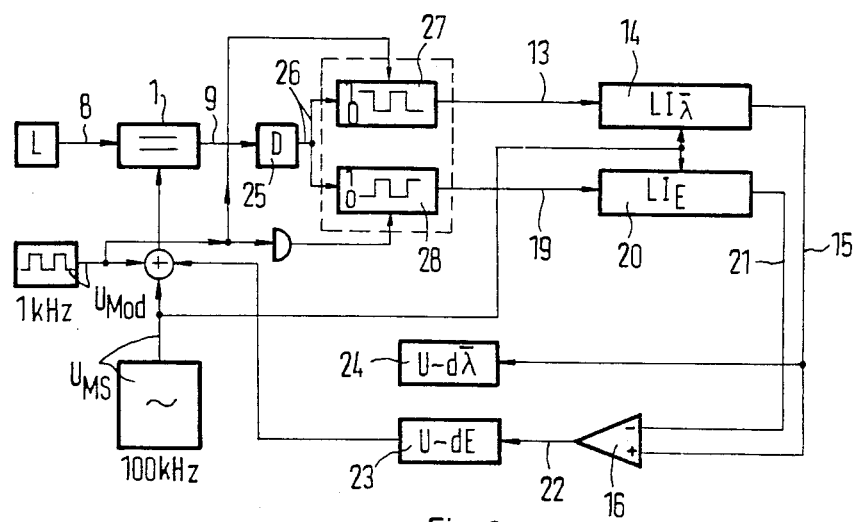
FIG. 6 is a schematic diagram of an embodiment of a circuit according to the invention in which the two modes of polarization are separated by electronic means.

As shown in FIGS. 5 and 6, a beam from the laser L, e.g., a beam 8 emerging at the rear of the laser, enters one end face 4 of the resonator 1. At the exit end face 5, Fabry-Perot transmission is obtained if the resonator is suitable for this wavelength.

The invention is predicated on the discovery that the angle of incidence of beam 8 on surface 4 can be so chosen that a division into two modes of polarization, which is normally undesired, will take place. The two modes have respectively different polarization planes. As a result of the different refractive indices in the resonator 1, the peak wavelengths of the two polarizations are different. The two polarization modes $\Phi_{OTE}$ and $\Phi_{OTM}$ shown in FIG. 4 are obtained if the peak wavelength of the resonator's filter curve lies in the region of these modes. This can be achieved by applying to the electrodes 6, 7 of the resonator 1 a DC voltage, or a bias, $U_v$ at which the refractive index n of the resonator 1 is adjusted so that the transmission curve falls within the range required. By converting the bias $U_v$ into a suitable modulating voltage $U_{Mod}$, e.g., a square-wave voltage, or by adding an additional voltage, the voltage at the electrodes of the resonator 1 and the refractive index of the latter can be adjusted so that one of the polarization modes, $\Phi_{OTE}$, occurs at one bias voltage level, and the other polarization mode, $\Phi_{OTM}$, at the other bias voltage level. In FIG. 4, the former polarization mode is shown as a solid line, and the latter as a broken line.

Furthermore, the invention is predicated on the discovery that the polarization mode $\Phi_{OTM}$ is shifted in phase with respect to the polarization mode $\Phi_{OTE}$, and that the phase difference varies with the temperature of the resonator 1. This temperature-dependent phase change is used in the present invention to eliminate the temperature drift of the resonator 1, i.e., the temperature-dependent drift of the transmission curve of the polarization mode $\Phi_{OTE}$, by detecting the output lightwave 9 and converting it to an electric signal, determining the temperature-dependent phase difference between the two polarization modes therefrom, and deriving from the magnitudes of the phase differences a control signal with which the temperature-dependent phase shift of the polarization mode $\Phi_{OTE}$ is adjusted to zero.

This is done by adjusting the temperature of the resonator 1 by means of a temperature controller associated with the resonator 1, e.g., a controller based on the Peltier effect, and/or by adjusting the refractive index n of the resonator 1 by application of a control voltage to the electrodes 6, 7 of the resonator 1 in such a way that the temperature-dependent phase shift of the polarization mode $\Phi_{OTE}$ disappears. A resonator 1 with a highly constant transmission curve is thus obtained which can be used as a Fabry-Perot interferometer. Relative wavelength stability values of $10^{-9}$ can be realized.

In the circuit arrangement shown in FIG. 5, the beam 8 from laser L enters one end face 4 of resonator 1 at an angle differing from the principal axes of polarization in such a way that the two possible polarizations are obtained. The resonator 1 is designed to act as a Fabry-Perot interferometer in the region of the wavelength of the laser beam and to have a transmission peak in this region.

The control electrodes of the resonator 1 are subjected to a square-wave modulating voltage $U_{Mod}$ of, e.g., 1 kHz with which the resonator can be switched from the peak wavelength of one polarization mode, $\Phi_{OTE}$, to that of the other, $\Phi_{OTM}$, by changing the resonator refractive index.

The beam 9 emerging from the resonator 1 is optically split up, e.g., by means of a Wollaston prism 10 into the TE polarization and the TM polarization respectively. The phase changes d $\Phi_{TE}$ and d $\Phi_{TM}$ respectively are measured by lock-in techniques. Each phase change d $\Phi$ corresponds to the difference between the present phase value, $\Phi_{TE}$ or $\Phi_{TM}$, and a reference phase bearing a fixed relation to $\Phi_{OTE}$ or $\Phi_{OTM}$, respectively.

The beam 11, containing the polarization mode change d$\Phi_{TE}$, is passed to a first optical-to-electric transducer 12, e.g., a photodiode, which feeds a corresponding first measurement signal 13 to a first phase detector, or lock-in amplifier, 14. The output 15 of the first phase detector 14 is connected to the first input (+) of a difference element 16, e.g. a differential amplifier. The beam 17, containing the polarization mode change d$\Phi_{TM}$, is passed to a second optical-to-electric transducer 18, whose output provides a second measurement signal 19, which is fed to a second phase detector 20. The output 21 of the second phase detector 20 is fed to the second input (−) of difference element 16. The latter applies a control signal 22 corresponding to the temperature-dependent phase shift between the two modes through a controller 23 to control electrodes 6, 7 of resonator 1. This control signal changes the refractive index of the resonator so that the temperature-dependent phase difference change between the two modes of polarization becomes zero when resonator 1 is properly tuned.

FIG. 4 shows the Fabry-Perot modes of the two polarization states. The phase separation between two transmission maxima is $2\pi$. l, $l_o$ are integers.

By applying a sinusoidal modulation to the electrodes ($U_{MS}$) of the resonator 1, AC signals are achieved representing possible phase deviations from $\Phi_{OTE}$ and $\Phi_{OTM}$, respectively. These signals are measured by the two lock-in amplifiers very precisely. If the resonator 1 is properly tuned by the outputs of the lock-in amplifiers 14 and 15, i.e. resonator 1 is temperature compensated, lock-in amplifier 14 provides the information of the phase deviation d $\Phi_{TE}$ which then is a measure for laser frequency changes.

Instead of or in addition to controlling the resonator 1 electrically, the resonator's temperature may be controlled in such a way that the phase difference disappears. This can be done using Peltier elements, for example.

As noted above, the sinusoidal modulating voltage $U_{MS}$, e.g., at a frequency of 100 kHz, is impressed on resonator 1. It modulates the output beam 9 and is applied to the phase detectors 14 and 20. The output of the phase detector 14 is fed to a controller 24 whose output changes the input current to and/or the temperature of the laser L in such a way as to make or keep the peak wavelength of the laser equal to the peak wavelength of the filter curve of stabilized resonator 1. This method is described in detail in DE-OS No. 34 21 851. With the arrangement according to the present invention, the laser peak wavelength, which is regulated using resonator 1 as a reference element, can be additionally stabilized with respect to the possible drift, particularly the temperature, drift of this reference element.

In the circuit shown in FIG. 6, the output beam 9, instead of being divided by an optical divider 10, is converted by a single optical detector 25 to an electric signal 26 containing the two modes of polarization and their temperature-dependent phase changes. This electric signal is fed to a single signal-separating controller or to two separate controllers, or conductors, 27 and 28. These are controlled by the modulating signal $U_{Mod}$, the signal for the controller 28 being inverted relative to that for controller 27. At a high voltage level, for example, $U_{Mod}$, the upper controller 27 is thus turned on when the resonator is driven so as to operate in the polarization mode $\Phi_{OTE}$, and after half a period, the lower controller 28 is turned on by a high voltage level from the inverter when the resonator 1 is driven so as to operate in the polarization mode $\Phi_{OTM}$.

The remainder of the construction and operation of the circuit is as described with reference to FIG. 5. Again, the sinusoidal modulating voltage $U_{MS}$ can additionally be used to simultaneously control the laser wavelength.

Advantageously, the turn-on instant of each controller 27, 28 is slightly delayed, and the turn-off instant is advanced, relative to the corresponding edge of the modulating voltage. This gives "on" times $\Delta t_1$ and $\Delta t_3$ each shorter than one-half of a period or one pulse duration, and a dead time $\Delta t_2$ in the edge region during which neither of the controllers 27, 28 is active, as shown in FIG. 4. In this manner, any disturbances that may occur in the region of the edges are suppressed.

The invention now being fully described, it will be apparent to one of ordinary skill in the art that many changes and modifications can be made thereto without departing from the spirit or scope of the invention as set forth herein.

The present disclosure relates to the subject matter disclosed in German Application No. P 36 17 562.5 of May 24th, 1986, the entire specification of which is incorporated herein by reference.

I claim:

1. Circuit arrangement comprising: a controllable optical resonator having a filter characteristic with a transmission peak arranged to pass laser radiation at a wavelength in the region of the transmission peak, wherein said resonator is positioned to receive the laser radiation at an angle such that two modes of the radiation, having respectively different polarization states, and wavelengths, are capable of propagating in said resonator, said resonator having control electrodes connected for receiving a voltage which determines the wavelength of the transmission peak of the filter characteristic; means connected for applying to said electrodes a square-wave modulating voltage which varies between a first value which causes the transmission peak of said resonator to be substantially at the wavelength of one of the modes and a second value which causes the transmission peak of said resonator to be substantially at the wavelength of the other one of the modes; means optically coupled to said resonator for deriving two electrical signals each corresponding to radiation passing through said resonator in a respective one of the two modes; means connected for determining the phase difference between the two electrical signals; and means connected for acting on said resonator in a manner to reduce the phase difference to zero on the basis of at least one of the electrical signals.

2. A circuit arrangement as defined in claim 1 wherein:
said means optically coupled to said resonator comprise: an optical divider which divides the radiation passing through said resonator into two separate components each composed of radiation in a respective one of the two modes; and two radiation-to-electrical signal transducers each arranged to receive a respective one of the components for producing a respective electrical signal corresponding to the respective component; and
said means connected for determining the phase difference comprise: two phase detectors each connected to receive the electrical signal from a respective transducer and to produce an output signal representative of the phase of the signal provided by the respective transducer; and a difference-forming element having two inputs each connected to the output of a respective phase detector and having an output for supplying a control voltage proportional to the phase difference between the radiation in the two modes, said control voltage being supplied to said means for acting on said resonator.

3. A circuit arrangement as defined in claim 2 wherein said means for acting on said resonator operate to apply the control voltage to said control electrodes of said resonator.

4. A circuit arrangement as defined in claim 2 wherein said means for acting on said resonator comprise means connected to the output of said difference forming element for controlling the temperature of said resonator as a function of the control voltage.

5. A circuit arrangement as defined in claim 2 further comprising: means for producing a second modulating voltage having a sinusoidal waveform and connected for supplying the second modulating voltage to said control electrodes and to said phase detectors; a laser for producing the laser radiation; and means connected for receiving the output signal from one of said phase detectors for controlling the operation of said laser.

6. A circuit arrangement as defined in claim 5 wherein said means for controlling the operation of said laser are operative for controlling the laser radiation wavelength.

7. A circuit arrangement as defined in claim 5 wherein said means for controlling the operation of said laser are operative for controlling the laser output power.

8. A circuit arrangement as defined in claim 5 wherein said means for controlling the operation of said laser are operative for controlling the temperature of said laser.

9. A circuit arrangement as defined in claim 1 wherein:
said means optically coupled to said resonator comprise: an optical detector disposed for receiving the radiation passing through said resonator and deriving an electrical signal representative thereof; and two controllable conductors each connected to receive the electrical signal from said detector and to be controlled by the modulating voltage so that each of said conductors conducts the electrical signal only during the time when the modulating voltage has a respective one of the values so that each conductor conducts only the electrical signal portion associated with a respective radiation mode; and
said means connected for determining the phase difference comprise: two phase detectors each connected to receive the electrical signal portion conducted by a respective one of said conductors and to produce an output signal representative of the phase of the signal portion provided by the respective conductor; and a difference forming element having two inputs each connected to the output of a respective phase detector and having an output for supplying a control voltage proportional to the phase difference between the radiation in the two modes, said control voltage being supplied to said means for acting on said resonator.

10. A circuit arrangement as defined in claim 9 wherein each conductor is conductive during a period which is shorter than the time during which the modulating voltage has the respective value, and both of said conductors are nonconductive during each transition of the modulating voltage between the first and second values.

11. A circuit arrangement as defined in claim 9 further comprising: means for producing a second modulating voltage having a sinusoidal waveform and connected for supplying the second modulating voltage to said control electrodes and to said phase detectors; a laser for producing the laser radiation; and means connected for receiving the output signal from one of said phase detectors for controlling the operation of said laser.

12. A circuit arrangement as defined in claim 11 wherein said means for controlling the operation of said laser are operative for controlling the laser radiation wavelength.

13. A circuit arrangement as defined in claim 11 wherein said means for controlling the operation of said laser are operative for controlling the laser output power.

14. A circuit arrangement as defined in claim 11 wherein said means for controlling the operation of said laser are operative for controlling the temperature of said laser.

* * * * *